No. 756,658.

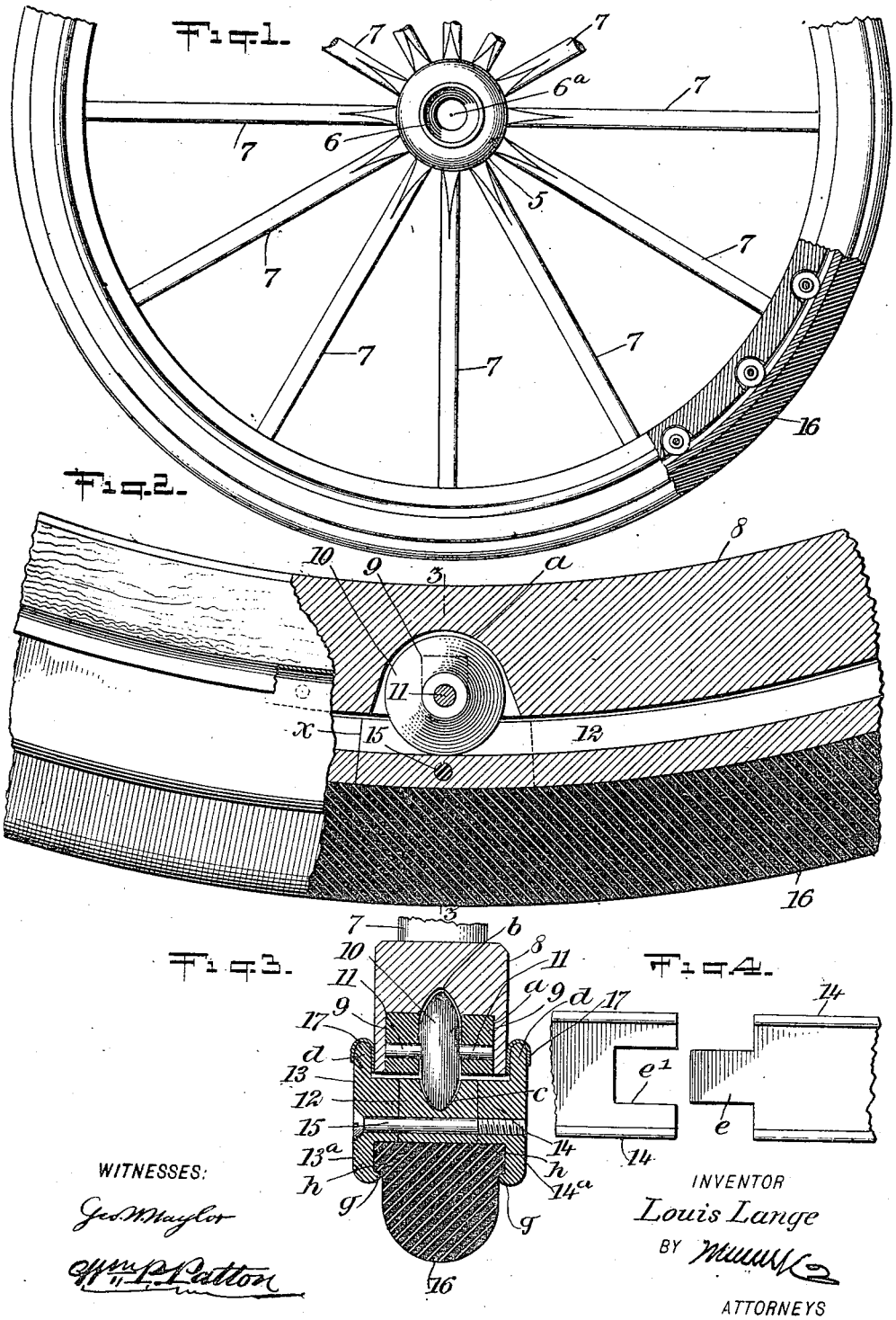

Patented April 5, 1904.

UNITED STATES PATENT OFFICE.

LOUIS LANGE, OF NEW YORK, N. Y.

VEHICLE-WHEEL.

SPECIFICATION forming part of Letters Patent No. 756,658, dated April 5, 1904

Application filed January 30, 1904. Serial No. 191,250. (No model.)

*To all whom it may concern:*

Be it known that I, LOUIS LANGE, a citizen of the United States, and a resident of the city of New York, borough of Manhattan, in the county and State of New York, have invented a new and Improved Vehicle-Wheel, of which the following is a full, clear, and exact description.

This invention relates to a class of vehicle-wheels wherein the peripheral portion of the wheels is held to rotate upon the body of the wheel, and has for its object to provide novel details of construction for a vehicle-wheel that adapt a rubber tire and its shoe to receive antifrictional support on the wheel-rim, that is held concentric with a wheel-hub by a series of spaced radial spokes.

A further object is to provide independent box-supports for a series of antifriction-wheels and journals thereon, which are held spaced in pockets in the wheel-rim and at their convexed peripheries have loose bearings in a conforming annular channel that is formed in the adjacent face of the tire-holding shoe, a further object being to so construct details of the shoe-clamp that it will be adapted to loosely embrace the wheel-rim at and near the peripheral edge of the rim and close an intervening crevice, thus excluding dust, mud, or water from the box-bearings of the journals on the antifriction-wheels.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side view in part of a vehicle-wheel embodying features of the invention, parts of the wheel-rim, shoe, and tire being broken away and in section to show other details. Fig. 2 is an enlarged partly-sectional side view of a wheel-rim, shoe, and tire embodying novel features of construction. Fig. 3 is a transverse sectional view substantially on the line 3 3 in Fig. 2, and Fig. 4 is a side view of the end portions of a shoe connection employed.

The hub 5 may be formed as usual and fitted with a spindle-box 6, wherein an axle-spindle $6^a$ is held to rotate; but the hub and box are preferably held from rotation on the spindle by any preferred means. From the hub 5 radiate a suitable number of spokes 7, so as to space apart their outer ends an equal degree. The hub and spokes may be of wood or metal, and the latter have a suitable length to conform with a desired diameter for the wheel, and at their outer ends the spokes 7 are secured upon or in a wheel-rim 8. At spaced intervals a series of recesses $a$ are formed in the rim 8, extending from the transverse center of its peripheral surface toward the axis of the hub 5. In each recess $a$ is fitted a pair of boxes 9, that may be rectangular in their bodies and have equal dimensions, said boxes being as pairs spaced from each other and transversely perforated to form a journal-bearing in each box.

An antifriction-wheel 10 is placed between each pair of boxes 9, these wheels of the series provided being similar in form, having a transverse dimension or thickness which adapts them to fit between a corresponding pair of said boxes, and from the center of each antifriction-wheel a journal-shaft 11 projects for a loose engagement within the alined perforations in the paired boxes 9. The similar antifriction-wheels 10 have such diameter as permits their peripheral surface to project beyond the boxes 9, said projecting peripheral portions of the wheels being preferably given ovate form in cross-section. Between each pair of boxes 9 a suitable recess $b$ is formed in the wheel-rim to permit the free embedment of the antifriction-wheels 10 in the wheel-rim 8 between each pair of boxes 9.

It will be seen that from the relative positions had by the antifriction-wheels 10 a portion of the body and ovate periphery of each wheel is held projected beyond the general peripheral surface of the wheel-rim 8.

A tire-holding shoe is provided which is formed of three rings, 12 indicating a central or core ring, 13 a side clamping-ring, and 14 a similar clamping-ring for the other side of the core-ring. The core-ring 12 is loosely fitted upon the periphery of the wheel-rim 8 and is grooved, as at c, on the inner side at its transverse center to correspond with the ovate form of the peripheral surfaces on the wheels 10; but, as shown in Fig. 3, it is preferred to widen the space between the sides of the groove c in the core-ring 12, so as to adapt the wheels to seat only on their peripheral centers, and thus reduce the area of frictional contact to a minimum. The core-ring 12 may for facilitating the reception of the projecting portions of the antifriction-wheels 10 be bisected and have the ends thereof neatly abutted upon each other, as at x, after the core-ring has been properly mounted upon the antifriction-wheels and wheel-rim 8.

The two similar open clamping-rings 13 14 each comprise a ring-body of an equal thickness with that of the core-ring 12, considering the latter from the wheel-rim 8 outwardly. Upon the edge portion of each clamping-ring 13 14 nearest to the corresponding sides of the wheel-rim 8 a circular flange d is formed, slightly spaced from the side of the wheel-rim to which it is opposed, and, as shown in Fig. 3, the free edges of the flanges d are rounded. The rings 13 14 are bisected and may have a tongue-and-notched engagement at their meeting ends, as indicated in Fig. 4, and it will be evident that when the tongue e is fully introduced into the notch e', that is shaped to neatly receive said tongue, the edges of a clamping-ring 13 or 14, that have been connected, as stated, will remain so when the clamping-plates are secured upon the opposite sides of the core-ring 12.

Upon the outer edges of the clamping-rings 13 14 a radial flange 13ª 14ª is formed on each, these flanges, which are preferably thicker than the flanges d, having each an inwardly-projecting annular rib g, formed on the inner surface at and near the outer edge thereof. At suitable intervals transverse-alined perforations are formed in the clamping-ring 13, core-ring 12, and claming-ring 14, these perforations receiving a similar number of bolts 15, that are threaded at one end to screw into a tapped outer end portion of the perforation which they occupy, said bolts, one being shown in the drawings, each having a kerfed head at its opposite end to permit the free use of a screw-driver for clamping together the rings 12 13 14.

A continuous rubber-tire ring 16 of usual form, that may have a shoulder h formed oppositely on each side thereof, is provided, and the relative construction and arrangement of the flanges 13ª, shoulders h, and ribs g is such that upon seating the tire-ring upon the peripheral surfaces of the rings 12 13 14 and drawing up the screw-bolts 15 the tire-ring will be forcibly clamped upon said rings.

In the narrow spaces formed between the flanges d and the adjacent side surfaces of the wheel-rim 8 one member of a guard-ring 17 is introduced into each crevice and loosely fills the same. The guard-rings 17, that are formed of any suitable material, are U-shaped in cross-section, and thus adapted to each embrace the flange d, upon which it is mounted, a member of each guard-ring lapping upon the outer surface of the flange d and nearly enveloping said flange. By the provision of the guard-rings 17 all foreign matter is excluded from the journals or working surfaces of the antifriction-wheels 10, so that a vehicle having the wheels of the improved construction applied thereon may be used in all seasons and traverse muddy roads without becoming clogged.

It will be seen that the operation of the details of the improved wheel will be nearly frictionless, as well as noiseless.

Having thus described my invention, I claim as new and desire to secure by Letters Patent—

1. A vehicle-wheel, embodying a hub, spokes, and a wheel-rim, said rim having recesses in its periphery, antifriction-wheels held to rotate in the recesses, and a three-part tire-clamping shoe adapted to clamp a rubber tire at its sides.

2. A vehicle-wheel, embodying a hub, spokes, and a wheel-rim, said rim having a plurality of spaced recesses in its peripheral face, a pair of oppositely-perforated boxes in each recess, an oppositely-journaled antifriction-wheel held to rotate between each pair of boxes by the engagement of the journals thereon in perforations in the boxes, a tire-clamping shoe formed in three sections that contact laterally, the central shoe-section having an annular channel on the inner side wherein the peripheries of the antifriction-wheel travel, a circular flange at the inner edge of each outer section of the clamping-shoe, said flanges lapping at the sides of the wheel-rim as guards, a radial flange projected from the outer edge of each outer shoe-section, said flanges each having an inwardly-projected rib, a rubber tire seated upon the shoe-sections and gripped by the ribs, and transverse screws engaging the shoe-sections, for clamping the ribs against and into the rubber tire.

3. A vehicle-wheel, comprising a hub, a series of spokes, and a wheel-rim held on the outer ends of the spokes, said rim having a series of spaced recesses formed in its peripheral surface, a pair of oppositely-perforated boxes bedded in each recess and spaced apart therein, an oppositely-journaled antifriction-wheel having an ovate-shaped periphery and engaging its journals in the pair of boxes, a three-part clamping-shoe comprising a core-ring and two similar side clamping-rings, the core-ring having an annular channel on its inner side wherein the ovate-shaped rims of the antifriction-wheels may be seated, a circular flange on the outer edge of each outer ring-section, said flanges being spaced from the wheel-rim and rounded on their edges, a U-shaped guard-ring occupying each space, a radial flange on each outer shoe-ring section, having a rib on its inner face, a rubber tire adapted to seat upon the shoe-ring sections and be gripped by the ribs, and screws adapted to clamp the shoe-ring sections upon the tire.

In testimony whereof I have signed my name to this specification in the presence of two subscribing witnesses.

LOUIS LANGE.

Witnesses:
JAMES J. CARROLL,
WILLIAM WADDOCK.